US012574579B2

(12) United States Patent
Ahsan et al.

(10) Patent No.: US 12,574,579 B2
(45) Date of Patent: Mar. 10, 2026

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Saba Ahsan, Espoo (FI); Ali Cengiz Begen, Istanbul (TK); Igor Danilo Diego Curcio, Vimercate (IT); Burak Kara, Istanbul (TK); Mehmet Necmettin Akcay, Istanbul (TK); Sujeet Shyamsundar Mate, Tampere (FI); Emre Baris Aksu, Tampere (FI); Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 274 days.

(21) Appl. No.: 18/562,613

(22) PCT Filed: May 13, 2022

(86) PCT No.: PCT/FI2022/050320
§ 371 (c)(1),
(2) Date: Nov. 20, 2023

(87) PCT Pub. No.: WO2022/248763
PCT Pub. Date: Dec. 1, 2022

(65) Prior Publication Data
US 2024/0187673 A1    Jun. 6, 2024

(30) Foreign Application Priority Data
May 26, 2021    (FI) ...................................... 20215621

(51) Int. Cl.
*H04N 21/2662*    (2011.01)
*G06F 3/01*    (2006.01)
(Continued)

(52) U.S. Cl.
CPC ......... *H04N 21/2662* (2013.01); *G06F 3/013* (2013.01); *G06T 7/0002* (2013.01);
(Continued)

(58) Field of Classification Search
CPC ....... H04N 21/2662; H04N 21/234345; H04N 21/23439; H04N 21/41407;
(Continued)

(56) References Cited

U.S. PATENT DOCUMENTS 10,841,532 B2 * 11/2020 Boyce .................. H04N 19/597
12,041,219 B2 * 7/2024 Gül .................. H04N 21/41407
(Continued)

FOREIGN PATENT DOCUMENTS

WO        2021/073940 A1    4/2021

OTHER PUBLICATIONS

Extended European Search Report received for corresponding European Patent Application No. 22810712.4, dated Feb. 4, 2025, 12 pages.
(Continued)

*Primary Examiner* — Sahar Aqil Riaz
(74) *Attorney, Agent, or Firm* — McCarter & English, LLP; Joseph C. Drish

(57) ABSTRACT

The embodiments relate to a method and a technical equipment for implementing the method. The method comprises receiving encoded omnidirectional video content for displaying, wherein the encoded omnidirectional video content comprises a viewport region, a margin region outside the viewport region and a background region (801); defining image regions to be included in the margin region, wherein the definition is based on a margin speed threshold (802); determining a head speed and a direction of motion (803); determining when the head speed is greater than or equal to the margin speed threshold, and as a response to the deter-
(Continued)

mining, adding negative margins in one or more direction with respect to the viewport (804); downloading the viewport with a first quality; and downloading the negative margins at a quality lower than the first quality (805).

15 Claims, 9 Drawing Sheets

(51) Int. Cl.
  *G06T 7/00* (2017.01)
  *G06T 7/20* (2017.01)
  *G06V 40/20* (2022.01)

(52) U.S. Cl.
  CPC ................. *G06T 7/20* (2013.01); *G06V 40/20* (2022.01); *G06T 2207/30168* (2013.01)

(58) Field of Classification Search
  CPC ......... H04N 21/42201; H04N 21/4223; H04N 21/44209; H04N 21/44213; H04N 21/4621; H04N 21/6587; H04N 21/816; H04N 21/4728; H04N 21/8456; G06F 3/013; G06F 3/011; G06T 7/0002; G06T 7/20; G06T 2207/30168; G06V 40/20
  USPC ........................................................ 725/116
  See application file for complete search history.

(56) References Cited

U.S. PATENT DOCUMENTS

| | | | |
|---|---|---|---|
| 2018/0241988 A1 | 8/2018 | Zhou et al. | |
| 2018/0288423 A1 | 10/2018 | Vembar et al. | |
| 2019/0230142 A1* | 7/2019 | He | H04L 65/70 |
| 2020/0037029 A1* | 1/2020 | He | H04L 65/612 |
| 2020/0177939 A1* | 6/2020 | Swaminathan | H04N 21/2662 |
| 2020/0322403 A1* | 10/2020 | Dvir | H04N 21/2402 |
| 2021/0306665 A1 | 9/2021 | Hourunranta et al. | |
| 2021/0352256 A1* | 11/2021 | Abhishek | H04N 13/194 |
| 2022/0021723 A1* | 1/2022 | Oyman | H04L 65/70 |
| 2022/0150460 A1* | 5/2022 | Abhishek | H04L 65/65 |
| 2023/0072093 A1* | 3/2023 | Hourunranta | H04N 21/21805 |
| 2024/0114176 A1* | 4/2024 | Ahsan | H04N 21/23439 |

OTHER PUBLICATIONS

"ITT4RT Permanent Document—Requirements, Working Assumptions and Potential Solutions", 3GPP TSG SA WG4 Meeting #113e, S4-210540, Agenda: 0.11.0, Nokia Corporation, Apr. 6-14, 2021, 85 pages.

"Tile-based Adaptive Streaming for Virtual Reality Video", ACM Transactions on Multimedia Computing, Communications, and Applications (TOMM), vol. 15, No. 4 Article No. 110, Dec. 2019, pp. 1-24.

"Multiple Margins over Spherical Coordinate System in ITT4RT", TSG SA4, S4-AHM573, LG Electronics Inc., Apr. 29, pp. 1-3.

"Information Technology—Coding of Audio-Visual Objects—Part 12: ISO Base Media File Format", ISO/IEC 14496-12, Fifth edition, Dec. 15, 2015, 248 pages.

"Information Technology—Coding of Audio-Visual Objects—Part 14: MP4 File Format", ISO/IEC 14496-14, First edition, Nov. 15, 2003, 18 pages.

"Information Technology—Coding of Audio-Visual Objects—Part 15: Advanced Video Coding (AVC) File Format", ISO/IEC 14496-15, First edition, Apr. 15, 2004, 29 pages.

"High Efficiency Video Coding", Series H: Audiovisual and Multimedia Systems, Infrastructure of audiovisual services—Coding of moving video, Recommendation ITU-T H.265, Feb. 2018, 692 pages.

"Information technology—Coded representation of immersive media (MPEG-I)—Part 2: Omnidirectional media format", ISO/IEC JTC 1/SC 29/WG 11, ISO/IEC FDIS 23090-2:201x (E), Apr. 26, 2018, 182 pages.

Schulzrinne et al., "RTP: A Transport Protocol for Real-Time Applications", Network Working Group, RFC 3550, Jul. 2003, pp. 1-89.

Office Action received for corresponding Finnish Patent Application No. 20215621, dated Dec. 17, 2021, 10 pages.

Curcio et al., "Viewport Margins for 360-Degree Immersive Video", IEEE 22nd International Workshop on Multimedia Signal Processing (MMSP), Sep. 21-24, 2020, 6 pages.

Nguyen et al., "An Optimal Tile-Based Approach for Viewport-Adaptive 360-Degree Video Streaming", IEEE Journal on Emerging and Selected Topics in Circuits and Systems, vol. 9, No. 1, Mar. 2019, pp. 29-42.

International Search Report and Written Opinion received for corresponding Patent Cooperation Treaty Application No. PCT/FI2022/050320, dated Nov. 2, 2022, 19 pages.

\* cited by examiner

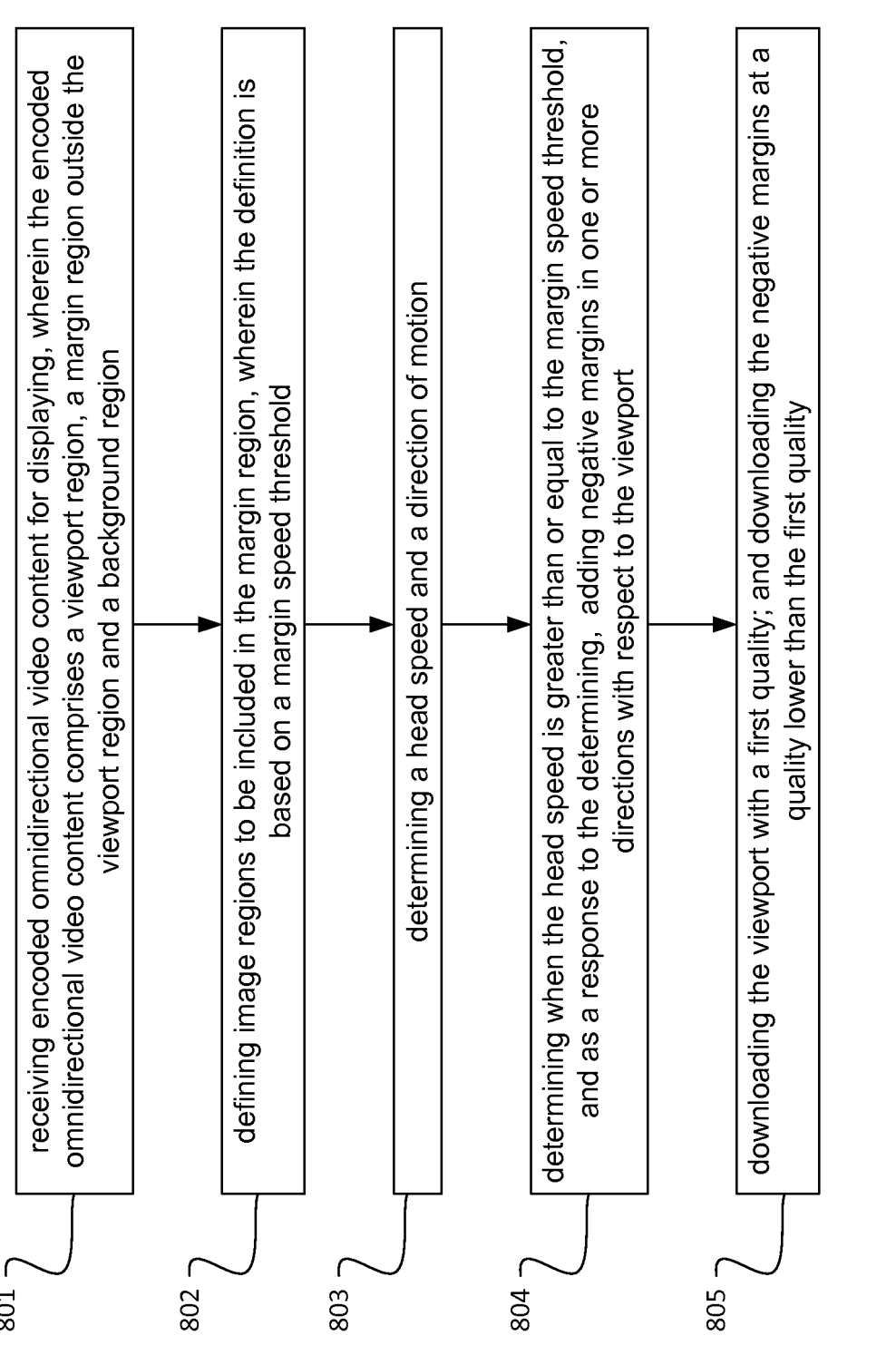

801 receiving encoded omnidirectional video content for displaying, wherein the encoded omnidirectional video content comprises a viewport region, a margin region outside the viewport region and a background region 802 defining image regions to be included in the margin region, wherein the definition is based on a margin speed threshold 803 determining a head speed and a direction of motion 804 determining when the head speed is greater than or equal to the margin speed threshold, and as a response to the determining, adding negative margins in one or more directions with respect to the viewport 805 downloading the viewport with a first quality; and downloading the negative margins at a quality lower than the first quality

Fig. 8

METHOD, AN APPARATUS AND A COMPUTER PROGRAM PRODUCT FOR VIDEO ENCODING AND VIDEO DECODING

RELATED APPLICATION

This application was originally filed as PCT Application No. PCT/FI2022/050320, filed on May 13, 2022, which claims priority from Application No. 20215621, filed on May 26, 2021, each of which is incorporated herein by reference in its entirety.

TECHNICAL FIELD

The present solution generally relates to video encoding and/or transmission and video decoding and/or reception.

BACKGROUND

Devices that are able to capture image and video have evolved from devices capturing a limited angular field of view to devices capturing 360-degree content. These devices are able to capture visual and audio content all around them, i.e., they can capture the whole angular field of view, which may be referred to as 360 degrees field of view. More precisely, the devices can capture a spherical field of view (i.e., 360 degrees in all spatial directions). In addition to the new types of image/video capturing devices, also new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is the entire sphere, is commonly referred to as virtual reality (VR) or omnidirectional video.

Third Generation Partnership Project (3GPP) Immersive Teleconferencing and Telepresence for Remote Terminals (ITT4RT) relates to omnidirectional video delivery in covering point-to-point and multiparty conversational applications. Viewport dependent delivery is a method to improve efficiency by reducing the bit rate of the content which is unwatched because it is outside of a user's viewport. Viewport dependent delivery is being standardized for conversational omnidirectional video content in 3GPP SA4 within the ITT4RT work item. In order to reduce data waste, a subset of the omnidirectional video may be delivered from a sender to a receiver at a higher quality, which covers the expected viewport orientation. Due to a delay in responding to a change in viewport orientation at the receiver, a region greater than a current viewport is delivered at a higher quality. This is expected to reduce the probability of a low-quality video in the viewport.

Areas outside the viewer's viewport may be called as margins. Margins can be extended on all or some sides of the viewport and may be at the same quality (or resolution) as the viewport or at a quality (or resolution) lower than the viewport but higher than the background. An area outside the viewport and the margins may be called as a background or a background area. The quality of the image (e.g., resolution) may be higher in the viewport region than in the area outside the viewport and the margins. Hence, the term high quality used in this disclosure means an image quality which is higher than image quality in the background.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided an apparatus comprising means for receiving encoded omnidirectional video content for displaying, wherein the encoded omnidirectional video content comprises a viewport region, a margin region outside the viewport region and a background region; means for defining image regions to be included in the margin region, wherein the definition is based on a margin speed threshold; means for determining a head speed and a direction of motion; means for determining when the head speed is greater than or equal to the margin speed threshold, whereupon the apparatus comprises means for adding negative margins in one or more direction with respect to the viewport; means for downloading the viewport with a first quality; and means for downloading the negative margins at a quality lower than the first quality.

According to a second aspect, there is provided an apparatus comprising at least one processor, memory including computer program code, the memory and the computer program code configured to, with the at least one processor, cause the apparatus to perform at least the following: receive encoded omnidirectional video content for displaying, wherein the encoded omnidirectional video content comprises a viewport region, a margin region outside the viewport region and a background region; define image regions to be included in the margin region, wherein the definition is based on a margin speed threshold; determine a head speed and a direction of motion; determine when the head speed is greater than or equal to the margin speed threshold, whereupon the apparatus is caused to add negative margins in one or more direction with respect to the viewport; download the viewport with a first quality; and download the negative margins at a quality lower than the first quality.

According to a third aspect, there is provided a method comprising receiving encoded omnidirectional video content for displaying, wherein the encoded omnidirectional video content comprises a viewport region, a margin region outside the viewport region and a background region; defining image regions to be included in the margin region, wherein the definition is based on a margin speed threshold; determining a head speed and a direction of motion; determining when the head speed is greater than or equal to the margin speed threshold, and as a response to the determining, adding negative margins in one or more direction with respect to the viewport; downloading the viewport with a first quality; and downloading the negative margins at a quality lower than the first quality.

According to a fourth aspect, there is provided a computer program product comprising computer program code configured to, when executed on at least one processor, cause an apparatus or a system to receive encoded omnidirectional video content for displaying, wherein the encoded omnidirectional video content comprises a viewport region, a margin region outside the viewport region and a background region; define image regions to be included in the margin region, wherein the definition is based on a margin speed threshold; determine a head speed and a direction of motion; determine when the head speed is greater than or equal to the margin speed threshold, whereupon the apparatus is caused to add negative margins in one or more direction with respect to the viewport; download the viewport with a first quality; and download the negative margins at a quality lower than the first quality.

According to an embodiment, margins in the direction of motion are added, and negative margins in the direction opposite to the direction of motion are added.

According to an embodiment, the background is downloaded with a second quality, wherein the second quality is less than the first quality, and other than the quality for downloading the negative margins.

According to an embodiment, blur speed threshold is determined, the blur speed threshold indicating a head motion speed during which a human is not able to focus on the content, and when the head speed is greater than the blur speed threshold, all the image regions are downloaded with a low quality.

According to an embodiment, a margin limit is determined, which is a range of a margin with respect to the viewport size that the margin should not exceed; and/or quality of image regions in the margin is determined.

According to an embodiment, distance of margin image regions is determined from a center of the viewport; the margin image regions are sorted based on the distance and a direction of motion; and when negative margins have been inserted, margin in the direction of motion is complemented with an equivalent set of margins until a margin limit is met.

According to an embodiment, a limit for negative margin is set dynamically based on one or more of the following: content, metadata, head motion traces, eye gaze, network performance, speed of pose change.

According to an embodiment, the limit for the negative margin is proportional to retrieved media segment duration.

According to an embodiment, the computer program product is embodied on a non-transitory computer readable medium.

DESCRIPTION OF THE DRAWINGS

In the following, various embodiments will be described in more detail with reference to the appended drawings, in which

FIG. 8 is a flowchart illustrating a method according to another embodiment.

DESCRIPTION OF EXAMPLE EMBODIMENTS

Figure 1:
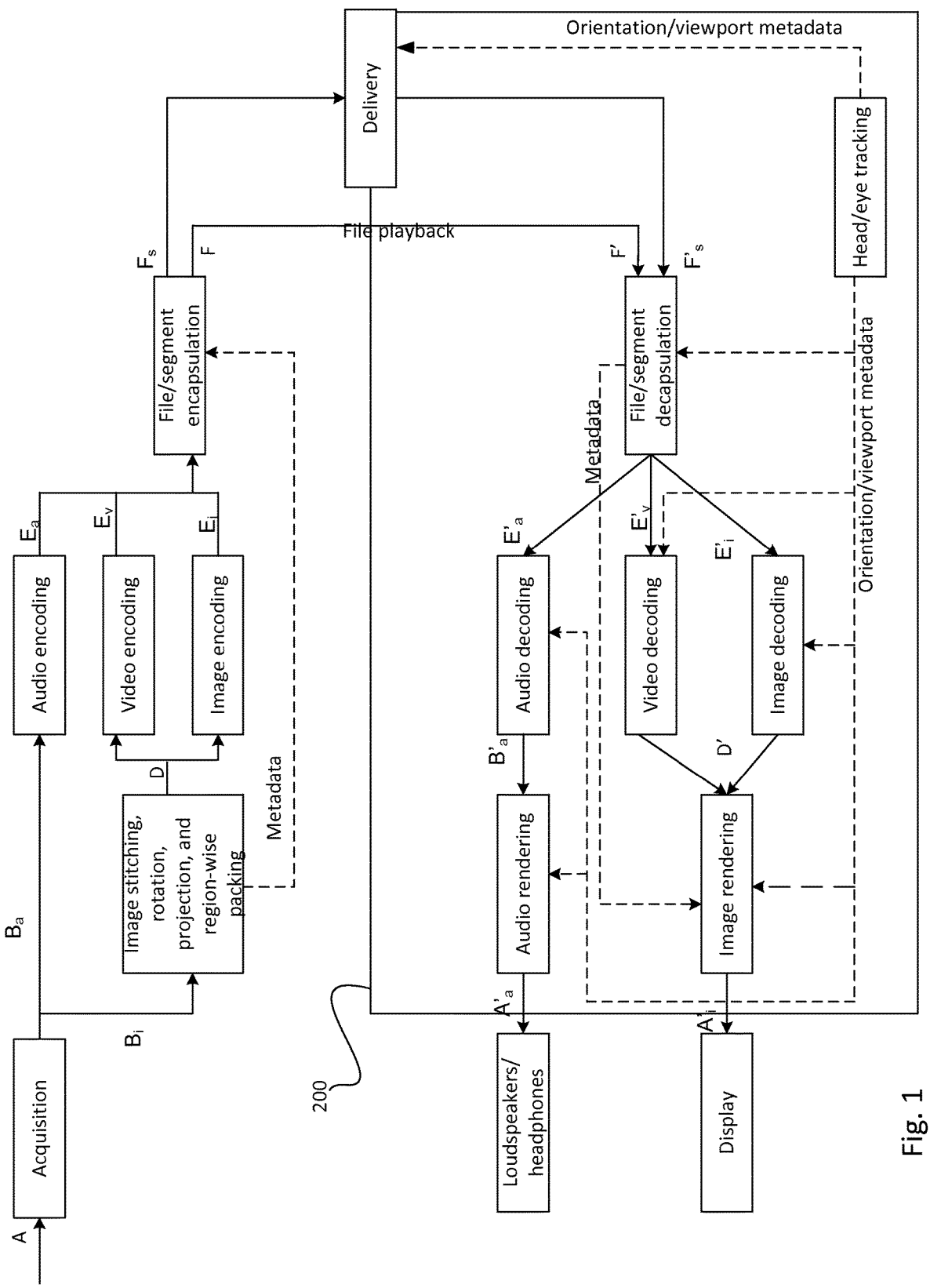
FIG. 1 shows an example of an OMAF end-to-end system.

The present embodiments relate to omnidirectional video streaming and conversational augmented reality or virtual reality (AR/VR) or cross reality (also referred to as extended reality) (XR) or mixed reality (MR). In the following, several embodiments of the disclosure will be described in the context of one video coding arrangement. It is to be noted that different embodiments may have applications widely in any environment where improvement of viewport dependent delivery of omnidirectional video is desired. For example, some embodiments may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment in included in at least one embodiment of the disclosure.

Since the beginning of photography and cinematography, the most common type of image and video content has been captured by cameras with relatively narrow field of view and displayed as a rectangular scene on flat displays. Such content may be referred as "flat content", or "flat image", or "flat video". The cameras are mainly directional, whereby they capture only a limited angular field of view (the field of view towards which they are directed). Such a flat video is output by a display device capable of displaying two-dimensional content.

More recently, new image and video capture devices have become available. These devices are able to capture visual and audio content all around them, i.e., they can capture the whole angular field of view, sometimes referred to as 360 degrees field of view. More precisely, they can capture a spherical field of view (i.e., 360 degrees in all spatial directions). Furthermore, new types of output such as head-mounted displays, and other devices, allow a person to see the 360-degree visual content.

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15).

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized. The embodiments of the present invention may also be implemented using other transport protocols, such as the Real-Time Transport Protocol (RTP) as described below. In general, the information transmitted to implement this invention can be transmitted using any protocol and any layers of the ISO (International Standardization Organization) OSI (Open Systems Interconnection) protocol stack.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises that still images are stored as items and image sequences are stored as tracks.

In the following, term "omnidirectional" refers to media content that may have greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than 360-degree view in the horizontal direction and/or 180-degree view in the vertical direction.

A panoramic image covering a 360-degree field-of-view horizontally and a 180-degree field-of-view vertically can be represented by a sphere that has been mapped to a two-dimensional image plane using the equirectangular projection (ERP). In this case, the horizontal coordinate may be considered equivalent to a longitude, and the vertical coordinate may be considered equivalent to a latitude, with no transformation or scaling applied. In some cases, panoramic content with a 360-degree horizontal field-of-view, but with less than a 180-degree vertical field-of-view may be considered special cases of equirectangular projection, where the polar areas of the sphere have not been mapped onto the two-dimensional image plane. In some cases, panoramic content may have less than a 360-degree horizontal field-of-view and up to a 180-degree vertical field-of-view, while otherwise having the characteristics of an equirectangular projection format.

Immersive multimedia, such as omnidirectional content consumption is more complex for the end user compared to the consumption of 2D content. This is due to the higher degree of freedom available to the end user. The freedom also results in more uncertainty. The MPEG Omnidirectional Media Format (OMAF) v1 standardized the omnidirectional streaming of single 3DoF (3 Degrees of Freedom) content (where the viewer is located at the center of a unit sphere and has three degrees of freedom (Yaw-Pitch-Roll). The following phase standardization for the OMAF v2 is close to completion. This phase is expected to enable multiple 3DoF and 3DoF+ content consumption with user interaction by means of overlays and multi-viewpoints, and means to optimize the Viewport Dependent Streaming (VDS) operations and bandwidth management.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV).

The 360-degree space may be divided into a discrete set of viewports, each separated by a given distance (e.g., expressed in degrees), so that the omnidirectional space can be imagined as a map of overlapping viewports, and the viewport is switched discretely as the user changes his/her orientation while watching content with an HMD. When the overlapping between viewports is reduced to zero, the viewports can be imagined as adjacent non-overlapping tiles within the 360-degree space. The H.265 video codec implements the concept of tiles which may be used to realize this scenario (both overlapping and not).

When transmitting omnidirectional video, a subset of 360-degree video content covering the viewport (i.e., the current view orientation) may be transmitted at the best quality/resolution, while the remaining of 360-degree video may be transmitted at a lower quality/resolution. This is what characterizes a VDS system, as opposed to a Viewport Independent Streaming system, where the omnidirectional video is streamed at high quality in all directions of the 360-degree space.

The OMAF standard (ISO/IEC 23090-2) specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be among the following: A recommended viewport per the director's cut, e.g., a viewport suggested according to the creative intent of the content author or content provider.

FIG. 1 illustrates the OMAF system architecture. The system can be situated in a video camera, or in a network server, for example. As shown in FIG. 1, an omnidirectional media (A) is acquired. If the OMAF system is part of the video source, the omnidirectional media (A) is acquired from the camera means. If the OMAF system is in a network server, the omnidirectional media (A) is acquired from a video source over network.

The omnidirectional media comprises image data ($B_i$) and audio data ($B_a$), which are processed separately. In image stitching, rotation, projection and region-wise packing, the images/video of the source media and provided as input ($B_i$) are stitched to generate a sphere picture on a unit sphere per the global coordinate axes. The unit sphere is then rotated relative to the global coordinate axes. The amount of rotation to convert from the local coordinate axes to the global coordinate axes may be specified by the rotation angles indicated in a RotationBox. The local coordinate axes of the unit sphere are the axes of the coordinate system that has been rotated. The absence of the RotationBox indicates that the local coordinate axes are the same as the global coordinate axes. Then, the spherical picture on the rotated unit sphere is converted to a two-dimensional projected picture, for example using the equirectangular projection. When spatial packing of stereoscopic content is applied, two spherical pictures for the two views are converted to two constituent pictures, after which frame packing is applied to pack the two constituent pictures on one projected picture. Rectangular region-wise packing can then be applied to obtain a packed picture from the projected picture. The packed pictures (D) are then provided for video and image encoding to result in encoded image ($E_i$) and/or encoded video stream ($E_v$). The audio of the source media is provided as input ($B_a$) to audio encoding that provides as an encoded audio ($E_a$). The encoded data ($E_i$, $E_v$, $E_a$) are then encapsulated into file for playback (F) and delivery (i.e., streaming) ($F_s$).

In the OMAF player 200, such as in an HMD, a file decapsulator processes the files (F', $F'_s$) and extracts the coded bitstreams ($E'_i$, $E'_v$, $E'_a$) and parses the metadata. The audio, video and/or images are then decoded into decoded data (D', $B'_a$). The decoded pictures (D') are projected onto a display according to the viewport and orientation sensed by a head/eye tracking device. Similarly, the decoded audio ($B'_a$) is rendered through loudspeakers/headphones.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), wherein each may contain a few seconds of multimedia data. A Cluster comprises BlockGroup elements, which in turn comprise Block Elements. A Cues Element comprises metadata which may assist in random access or seeking and may include file pointers or respective timestamps for seek points.

A transmission channel or a communication channel or a channel may refer to either a physical transmission medium, such as a wire, or to a logical connection over a multiplexed medium.

RTP is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. In an RTP session, each SSRC has its own sequence number space and timing. (SSRCs are only required to be unique in a given RTP session). A receiver device may group packets by synchronization source for playback. Examples of synchronization sources include the sender of a stream of packets derived from a signal source such as a microphone or a camera, or an RTP mixer. Each RTP stream is identified by an SSRC that is unique within the RTP session.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Figure 2A:
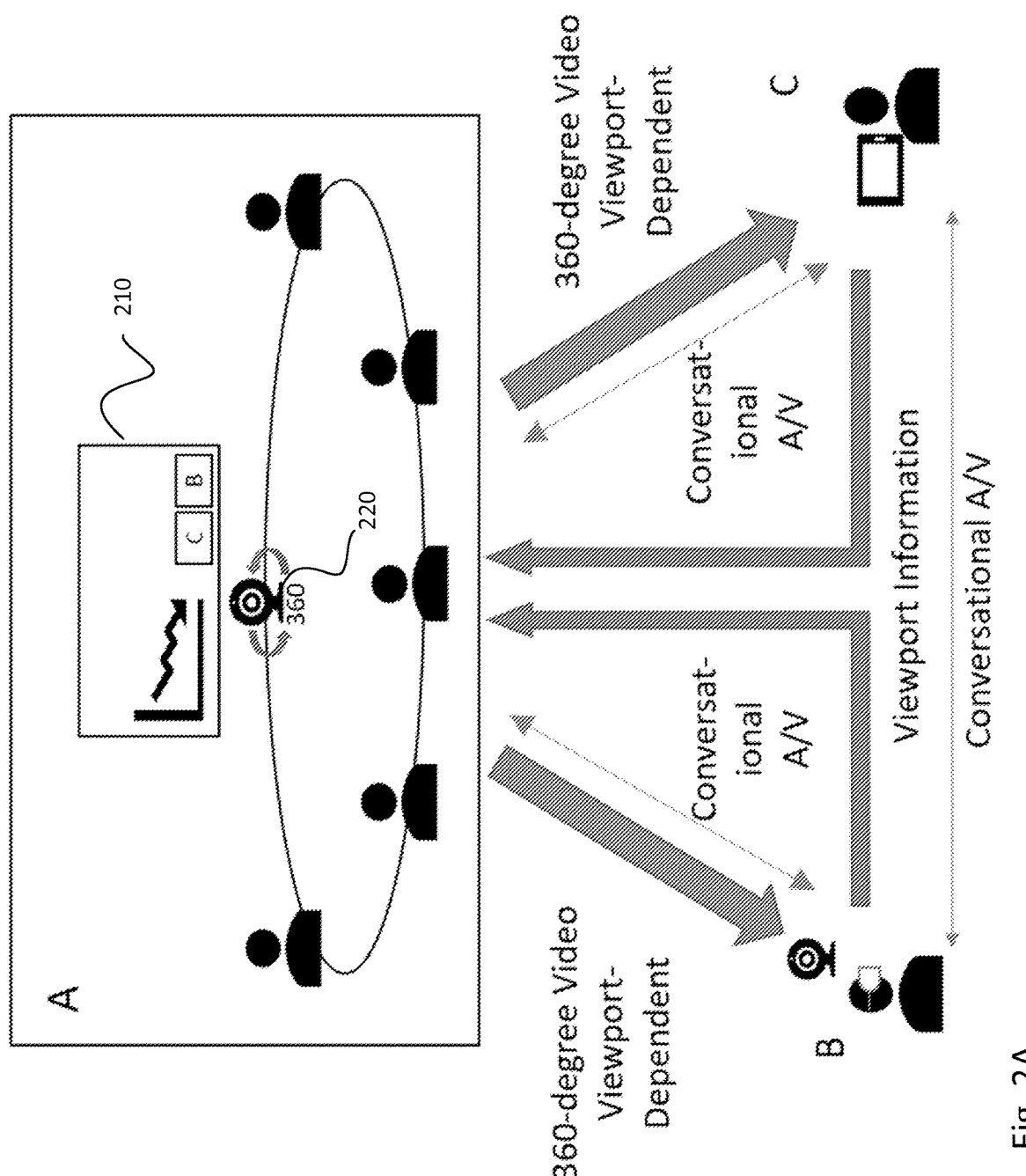
FIG. 2a-b show examples of a conference room with participants.
Figure 2B:
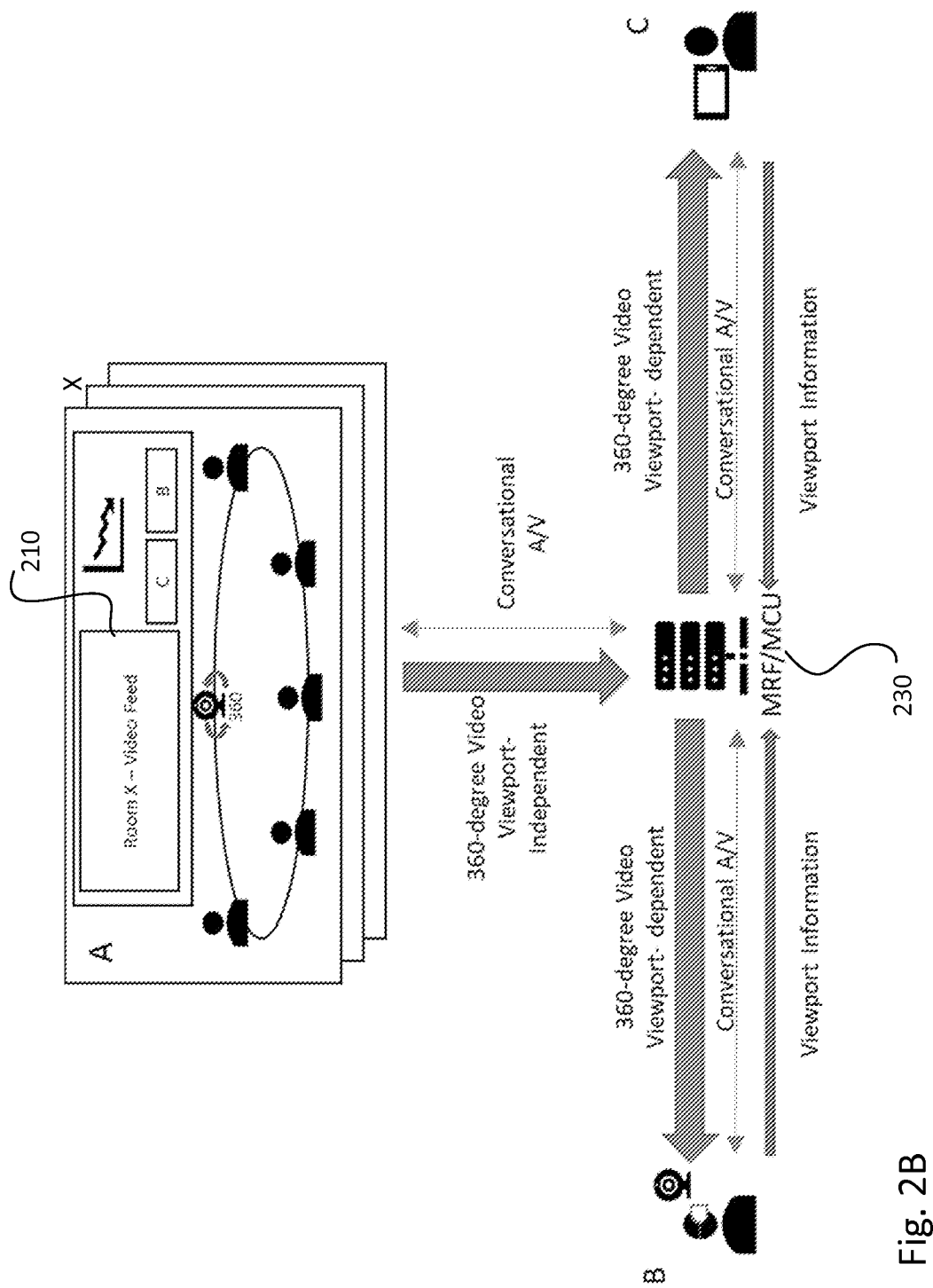

In the following, embodiments for a 360-degree event, such as a 360-degree conference, teleconference, telepresence, are discussed. However as was mentioned, in addition to the 360-degree conference, the embodiments are suitable for other delivery solutions, as well. FIGS. 2a-2b represent various scenarios for a 360-degree teleconference. A 360-degree conference can be a live meeting which is delivered to a receiver device(s) by the sender, wherein the sender is a video source, such as a 360-degree (i.e., omnidirectional) camera, or a system being operatively connected to a video source or comprising means to capture video. The deliverable content from the sender to the receiver comprises at least video or audio. The purpose of the sender is to deliver video being captured to receiver device(s). The sender may also comprise means for receiving at least audio data from receiver device(s), and output the received audio data to the participants of the event.

In FIGS. 2a-2b a group of participants is having a meeting in a conference room. The conference room can be considered as a virtual conference system A with physical elements (i.e., camera 220, view screen 210, physical participants) being able to share content to and to receive data from remote participants. According to an example, the virtual conference system A may comprise a 360-degree (i.e., omnidirectional) camera 220 and a view screen 210. The meeting is also participated by two remote participants B, C through a conference call. Physical participants of the virtual conference system A use the view screen 210 to display a shared presentation and/or video streams coming from the remote participants B, C. One of the remote participants B is using an HMD for having a 360-degree view to conference content and a camera that captures his/her video. One of the remote participants C uses a mobile phone to access the conference. The mobile phone is able to show a 360-degree video on the conference and to capture his/her video.

In the example of FIG. 2a, the conference call is set up without any media-aware network elements. Both remote participants B, C send information about their viewport to the virtual conference system A, which in turn sends them a viewport-dependent video stream from the 360-degree camera 220.

In the example of FIG. 2b, the conference call is set up using a network function, which may be performed by media function such as a Media Resource Function (MRF) or a Media Control Unit (MCU) 230. The virtual conference system for multiple conference rooms X are sending 360-degree video to an MRF/MCU 230. The rooms may choose to receive 2D video streams from other participants including one of the other rooms, which is displayed on the view screen 210 in the room. The remote participants B, C can choose to view any one or none of the available 360-degree videos from the multiple rooms. Switching from one room to another may be triggered manually, or using other mechanisms, such as viewing direction or dominant speaker. The MRF/MCU 230 may signal to pause the receiving 360-degree video from any of the rooms that do not currently have any active viewers.

In some embodiments, the 360-degree conference can be completely virtual, where all the meeting participants are remote participants, i.e., receiver devices connecting to the conference via a network, and where the sender is a computer generating a virtual representation of the virtual conference and the remote participants.

Head mounted display (HMD) is a device capable of rendering immersive content or XR/MR/AR/VR content. For that purpose, an HMD may comprise two screen sections or two screens for displaying images for left and right eyes. The displays are close to the eyes, and therefore lenses are used to make the images easily viewable and for spreading the images to cover as much as possible of the eyes' field of view. The HMD is attached to the head of the user so that it stays in place even when the user turns his head. The device may have an orientation detecting module for determining the head movements and direction of the head. The HMD gives a three-dimensional (3D) perception of the recorded/streamed content to a user. The user of the HMD sees, at a given time instant, only a portion of 360-degree content, referred to as viewport, the size of which is being defined by the vertical and horizontal field-of-views of the HMD. As mentioned, viewport is a portion of 360-degree content. Therefore, "viewport" is a term for defining a region of omnidirectional image or video suitable for display and viewing by the user, and is defined as the part of the spherical video that is currently displayed and hence is viewable by the user(s).

For determining the viewport, a conferencing system (comprising both sender and receiver) may support 3DoF. A system supporting 3DoF allows rotational head motion around yaw, pitch, and roll. In another embodiment, 6DoF (6 Degrees of Freedom) motion may be supported. 6DoF allows further translational head or body movements, in addition to the rotational movements, e.g., translationally moving head or body up, down, right, left, forwards and backwards, including walking around a space in any direction. 6DoF motion may be constrained to a defined space within which the user can move around (e.g., 3DoF+) or unconstrained.

The conference session may be established using session description or establishment protocols, e.g., SDP (Session Description Protocol) and SIP (Session Initiation Protocol). The media streams may be carried using real-time transport protocols with media control protocols, e.g., RTP, RTCP (RTP Control Protocol), SCTP (Stream Control Transmission Protocol), etc. In RTP transmission of omnidirectional video, RTCP (or RTP in the backward direction) may also be employed to convey viewport information to the sender. In practice, the HMD orientation is signaled to the sender, such that the sender can deliver the stream with the new viewport.

Transmission of RTCP viewport information may occur at constant rate or event-based. At constant rate, the viewport information may be sent, e.g., every X millisecond to the sender, irrespective of the head motion. At event-based, the sending of the viewport information may be triggered by the "head motion" event. ITT4RT (Immersive Teleconferencing and Telepresence for Remote Terminals) implementations may also use a hybrid approach that combines both constant rate and event-based approaches.

Figure 3:
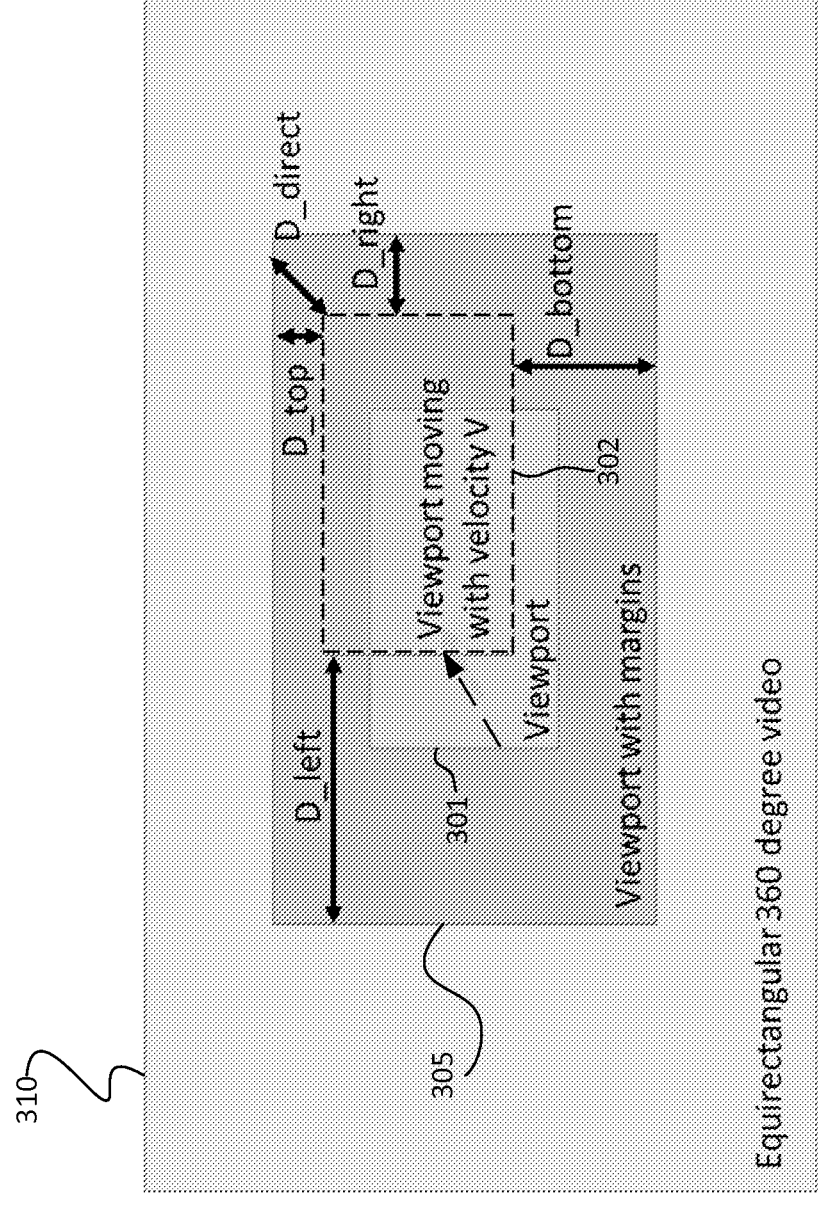
FIG. 3 shows an example of an equirectangular picture with a moving viewport.

FIG. 3 illustrates an equirectangular 360-degree projected picture 310. A viewport is referred to with a reference number 301. A moving viewport 302 is shown on the equirectangular 360-degree projected picture 310, where the high-quality region (viewport with margins) is referred to with a reference number 305, and the low-quality region is referred to with a reference number 310.

Viewport-dependent delivery (VDD) may be used for 360-degree video to optimize bandwidth utilization: higher quality content is delivered for the current viewport of the player/user, whereas the remaining background area is either not delivered at all or delivered at a lower quality. VDD may degrade user experience if the new viewport after pose change (change in viewport orientation) is not updated fast enough due to application or network delays. The time it takes for the new viewport to be upgraded to the highest viewport quality after the pose changes, is defined as the motion-to-high-quality delay. Viewport prediction algorithms may be used to determine the position of future viewports based on prior head motion traces, content, metadata, current speed, and direction, etc. These algorithms enable downloading content for the future viewport in advance in order to minimize the motion-to-high-quality latency. The present embodiments relate to the use of viewport margins for viewport-dependent 360-degree video streaming.

Viewport margins are regions extended around the viewport that may be at a higher quality than the background and equal or lower quality than the viewport. Extending the margins minimizes the chances of a viewer having low-quality content in the viewport during head motion (due to delayed update of the viewport region), though, at the cost of increased bandwidth consumption. Viewport margins may be symmetrical or uneven. Symmetrical margins are evenly distributed around the viewport, whereas uneven/directional margins are extended farther in a particular direction and reduced in others. The extension of uneven margins may be in response to the direction of motion, a dominant speaker, eye gazing, motion tracking, etc.

A margin may be extended in one or multiple directions around the viewport, e.g., in anticipation of a viewport change. The extension of such a margin increases the bandwidth consumption of the 360-degree video delivery and may adversely affect the viewing experience by creating congestion. Limiting the margin or lowering the quality of the entire viewport and/or margin can help mitigate the surge in bandwidth usage but may lead to longer motion-to-high-quality (MTHQ) delay. Due to head motion, certain parts of the current viewport may be assigned a lower priority (and these parts constitute an area referred to as negative margin). The lower priority can be assigned based on the viewport change characteristics or likelihood of inclusion in subsequent viewport(s).

In another embodiment, the lower priority for the current viewport and future viewports can be assigned to a region of the viewport to enable higher bitrate allocation to a subset of the viewport. This can be based on a high-quality viewport preference of the application or a session description parameter. The high-quality preference indicates the application prefers to have the highest possible quality in the viewport region. This high-quality preference may also be applicable to a subset of the viewport. The application preference or session description parameter can indicate whether the entire viewport or only a subset of the viewport should be in high quality. The indication may carry information about the extent of negative margin for the high-quality viewport or the extent may be adjusted automatically in response to, e.g., network conditions. Thus, in this embodiment the negative margin can be applied even for static viewport or when viewport change speed is slow (e.g., less than the margin threshold).

It is the purpose of the present embodiments to propose a method for use of negative margins to deprioritize content for the current viewport when using uneven margins.

The concept of negative margins in viewport-dependent delivery reduces wasted bandwidth due to the change in viewport orientation. Viewport margins extend outward from the viewport into the background area and are downloaded usually at a quality higher than the background and equal to or lower than the viewport quality. Negative margins extend inward into the viewport from the background area and are downloaded at a quality lower than the viewport quality. In response to a negative margin, an implementation may introduce complementary margins that extend outward from viewport margins into background area and are downloaded usually at a quality higher than the background and equal to or lower than the viewport quality. The present embodiments also summarize a method for implementing negative margins.

Figures 4A, 4B:
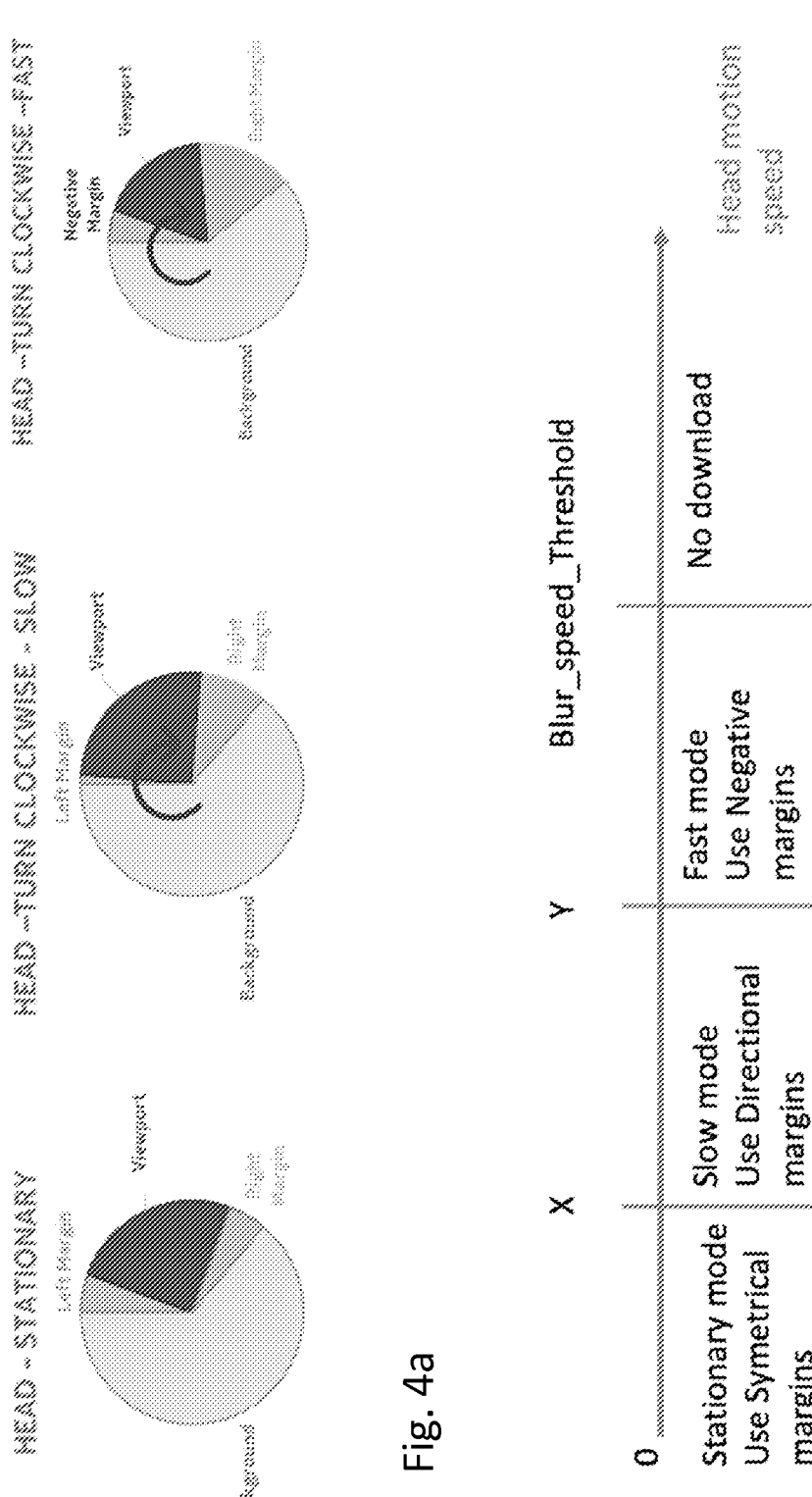
FIG. 4a shows an example of a use of directional margin and negative margin based on a head motion speed.
FIG. 4b shows an example of four modes of operations according to the head motion speed.

According to present embodiments, a negative margin is extended inward in the viewport region in the direction opposite to the direction of the head motion or eye gaze. The quality of the negative margin is less than the viewport quality. FIG. 4a shows the use of the negative margins during head motion with directional viewport margins with a top view of the omnidirectional video sphere. When the head is stationary, the viewport margins are extended equally in both directions. When the head is turning slowly (i.e., below a given threshold of speed), the extent of the viewport margins is larger in the directions of motion. When the head is turning faster (i.e., above a given threshold of speed), the extent of the viewport margin in the direction of the head motion is extended even farther and a negative margin is introduced in the direction opposite to the motion. The viewport region with negative margin has lower quality compared to the viewport quality. A negative margin like a viewport margin, may be symmetrical or uneven (directional). According to an embodiment, the thresholds above may have the same value, or a single threshold may be used. FIG. 4b shows four modes of operations according to the head motion speed. During the "no download" stage, no high-quality viewport content is downloaded but full 360-degree video may still be downloaded.

Figures 5, 6:
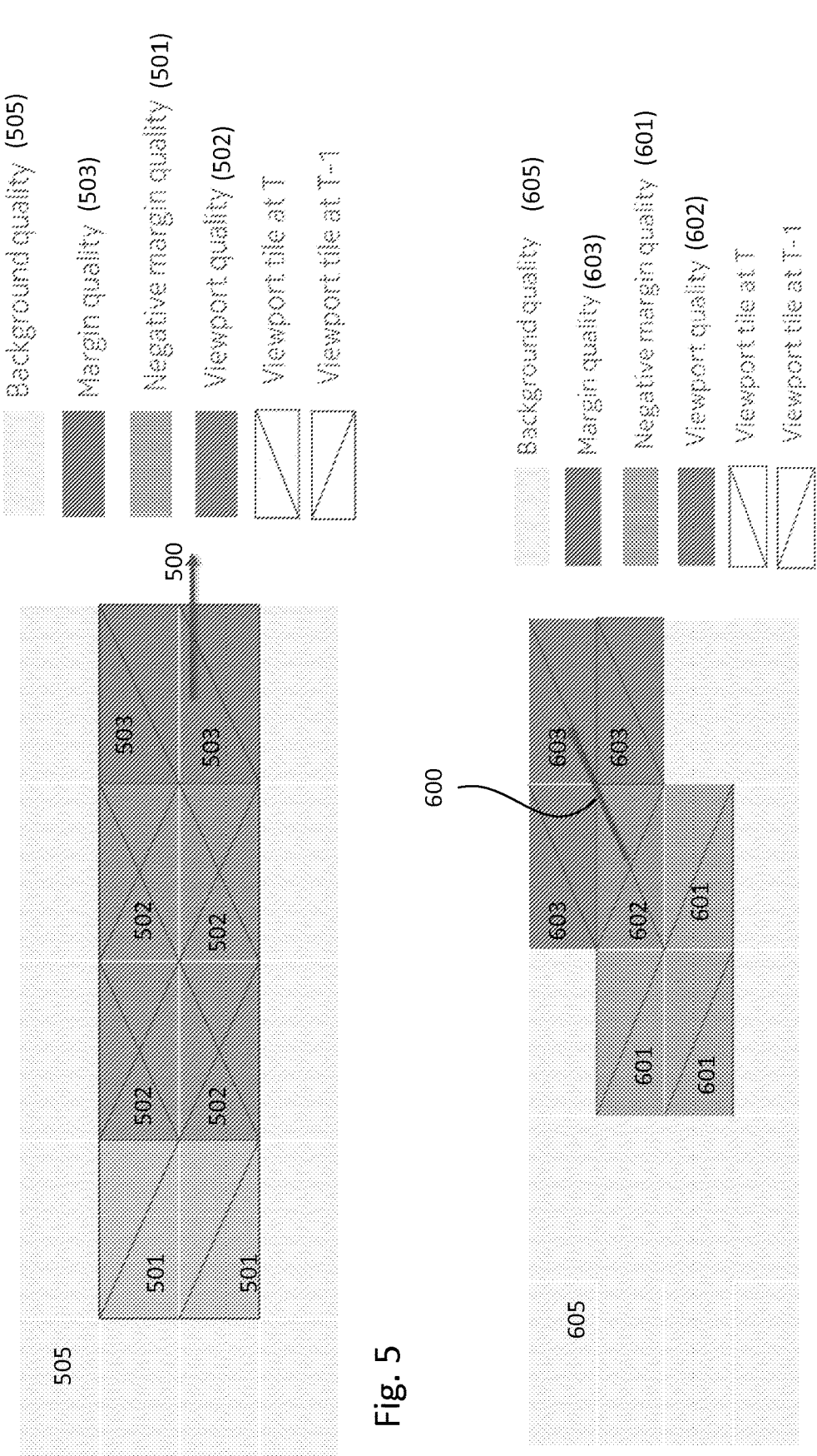
FIG. 5 shows an example of negative and viewport margins shown for a tiled video during horizontal motion.
FIG. 6 shows an example of negative and viewport margins shown for a tiled video during diagonal motion.

FIG. 5 illustrates an Equirectangular projection (ERP) view of a video with a 5×4 tile grid at time T with horizontal head motion as indicated by the arrow 500. The viewport is supposed to be of size 3×2. The reference number 505 refers to background quality; the reference number 501 refers to negative margin quality; the reference number 502 refers to viewport quality; the reference number 503 refers to viewport margin quality. The tiles that are in the rendered viewport at time T are shown with forward diagonals, whereas the tiles in the last rendered viewport at time T−1 are shown with backwards diagonals. The tiles present in both viewports have both diagonals, making a cross. The quality of each tile at time T is based on the viewport and head motion at T−1. The arrow 500 shows the movement of the head. FIG. 5 shows the case of correct prediction, with viewport margin tiles 503 being in the viewport at time T and negative margin tiles 501 no longer in the viewport. In this case, the viewport margin is equal to the negative margin (i.e., two tiles). In different implementation embodiments, the quality of each tile at time T or future time instances can be based on the viewport and head motion corresponding to a longer duration in the past.

FIG. 6 shows an ERP of a video with a 5×4 tile grid at time T with diagonal head motion as indicated by the arrow 600. The reference number 601 refers to negative margin quality; reference number 602 refers to viewport quality; and reference number 603 refers to viewport margin quality. viewport margins 603 are added at the diagonal in direction of motion and negative margins 601 are in the diagonal opposite to direction of motion. The direction of motion can be determined based on eye gazing or head motion. In this example, the negative margin 601 is equal to the viewport margin (i.e., one tile in all directions).

The technical implementation of directional margins with negative margins in tiled viewport-dependent delivery in an OMAF client is described by using Dynamic Adaptive HTTP Streaming (DASH) as an example. It is to be noticed, however, that the present embodiments and the implementation are independent of DASH tiled streaming.

The 360-degree video is divided into motion-constrained tile sets. The quality of the viewport is determined based on an appropriate adaptive bit rate (ABR) algorithm. In addition to determining the quality of the viewport and the background tiles, the ABR algorithm inserts viewport margin tiles if the bandwidth allows. The viewport margin tiles may be added based on the same metrics used by the ABR to determine tile quality, such as, buffer occupancy, time to download segments, available/observed throughput, etc. When the ABR determines there is capacity (or time) for additional download (by using any of the previously mentioned metrics), it can either increase the quality of the tiles in the viewport or introduce viewport margin tiles.

A margin_limit may be set such that viewport margins are set to not exceed a percentage of the viewport size, e.g., the margin_limit may be set to 30% of the viewport size, which implies additional tiles downloaded as margins around the viewport will not be more than 30% of the viewport tiles. According to another embodiment, the margin_limit is a limit on the area and not the number of tiles. The margin_limit of 30% would then imply that the area of the margin tiles (azimuth range×elevation range or number of pixels) does not exceed 30% of the area of the viewport tiles.

A margin_speed_threshold may be set such that
when the head motion speed is less than margin_speed_threshold, viewport margins are extended equally around the viewport; and
when the head motion speed is greater than or equal to margin_speed_threshold, the player determines the direction of motion and the spherical distance of the surrounding tiles. It then extends the viewport margins in the direction of motion to cover the nearest tiles.

A blur_speed_threshold is a value against which a head motion speed is compared. When the head motion speed is greater than the value of blur_speed_threshold, the player does not download any tiles at high quality since the speed is too high for a human to be able to focus on the quality of the content. Therefore, blur_speed_threshold sets a threshold for a head motion speed during which a human is not able to focus on the content.

According to an embodiment, for the time when margin_speed_threshold is less than or equal to the head motion speed, which is smaller than blur speed threshold (i.e., margin_speed_threshold<=head motion speed<blur speed threshold); the player applies a negative margin in the direction opposite to the direction of motion, thus shrinking the viewport in that area. This gives the player the capacity to further extend the viewport margin in the direction of motion using complementary margins. According to an embodiment blur_speed_threshold may not be used and the player applies negative margin whenever margin_speed_threshold is less than or equal to head_motion_speed (margin_speed_threshold<=head_motion_speed).

In an implementation, in order to determine which tiles should be added to the viewport margin or negative margin, the spherical distance (e.g., using the Haversine formula) from the center of the viewport and the angular difference from the direction of motion are used. Euclidean distance rates adjacent tiles in all directions of viewport at the same distance and all diagonal tiles have a greater distance from the center than the tiles in horizontal and vertical directions around the viewport. This may result in the player picking the wrong tiles, especially during diagonal motion. All tiles outside the viewport are sorted based on the shortest spherical distance from the center. A second sorting is done based on lowest angular difference to the direction of motion. The required tiles that fulfil the margin_limit can then be selected from the top of the sorted list as viewport margin and complementary margin tiles. A negative margin tile is selected from the viewport tiles such that it has the maximum spherical distance from the complementary margin found in the motion direction and maximum angular difference from the direction of motion. Margin tiles that minimize $abs(arctan(V_{mi})-arctan(headMotion))$ are selected to get the priority with the motion direction in 2D tile space for directional margins. $V_{mi}$ is a vector starting from the center of the current viewport to the center of a margin tile.

Figure 7:
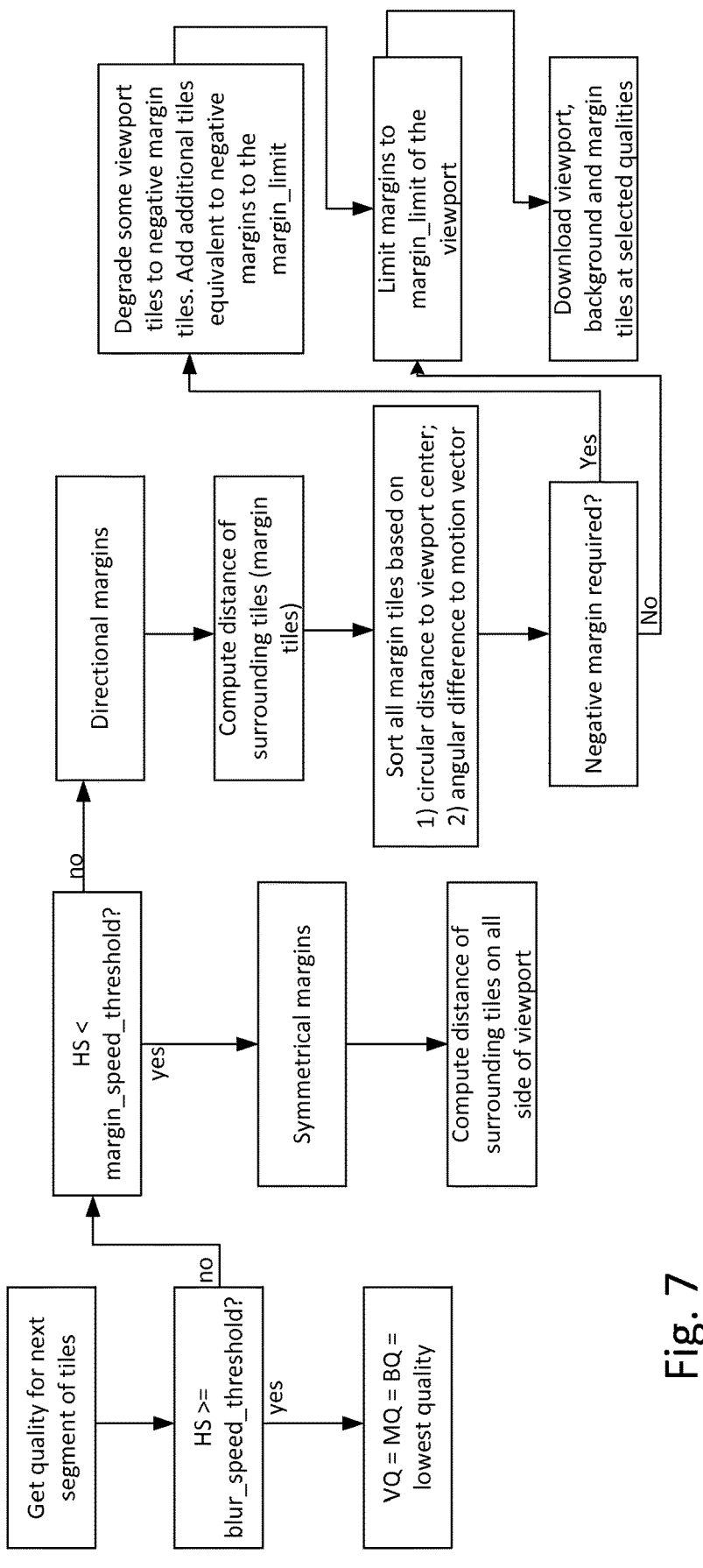
FIG. 7 is a flowchart illustrating a method according to an embodiment.

FIG. 7 shows a flowchart of a method according to an embodiment for using negative margins for tiled video. In the first step, the ABR algorithm decides the quality of the next segment of tiles or other image regions. Additionally, this may include a decision on the range of the viewport margin (e.g., 30% of the viewport) and the quality of the tiles in the viewport margin. Once the ABR has determined the quality, the next step is to check which tiles should be included in the viewport margin. To accomplish that, the player uses a head speed, and determines if the head speed (HS) is greater than the blur_speed_threshold; if true, the player stops downloading high-quality (HQ) content. Thus, the viewport quality (VQ) equals to margin quality (MQ) which equals to background quality (BQ). If the head speed (HS) is lower than the blur_speed_threshold, the player can either insert symmetrical viewport margins or directional viewport margins. It checks if the head speed is less than the margin_speed_threshold; if true, the head is not moving fast enough to require directional margins, so the viewport margin tiles are distributed symmetrically around the viewport. If the head speed is greater than the margin_speed_threshold, the viewport margin tiles are added in the direction of margin, i.e., directional margins. To select the tiles for directional margins, the player computes the distance of the surrounding (margin) tiles from the viewport center. The margin tiles are then sorted based on the distance and the absolute angular difference to the motion vector. The player then checks if negative margins need to be inserted; if true, some of the tiles from the viewport are degraded as negative margins, reducing the number of viewport tiles, and an equivalent set of complementary tiles (equivalent in number of tiles or size) is added to the margin_limit. In an embodiment, the number/size of complementary tiles is not equivalent to the number/size of margin tiles. Finally, the margin_limit is applied to the sorted list of margin tiles; the first x tiles that fit within the margin_limit remain as viewport margins and the remaining are considered background tiles.

The viewport margin, viewport, negative margin, and background tiles are downloaded at their respective qualities.

According to an embodiment, the negative margin may be downloaded at a quality other than background but lower than the viewport and viewport margin. During the presence of a negative margin, the complementary margin may be present in addition to the viewport margin depending on the viewport change speed and direction. According to an embodiment, the negative margin size is defined by the player such that it is proportional to the viewport margin size, where the viewport margin size is proportional to head motion speed (for head motion speed<blur_speed_threshold). According to an embodiment, the negative margin is defined such that the overall download impact of viewport margin tiles is bandwidth neutral, i.e., the overall bandwidth added by the download of complementary margins is the same as the bandwidth saved by the negative margins. Such a situation may occur, e.g., if there is lower likelihood of user changing head motion direction. According to an embodiment, the negative margin is defined such that the overall download impact of viewport margin is quality neutral. This means that the quality of the complementary margin tiles is the same as the quality at which the tiles selected for negative margin were to be downloaded in the absence of a negative margin. Bandwidth or quality neutrality may include the impact of viewport margins or may be limited to only the negative and complementary margins. For example, in an embodiment, the bandwidth saved due to negative margins may be used for increasing the quality of the viewport margins instead of introducing additional complementary margins.

According to an embodiment, the negative margin reduces bandwidth consumption during head motion, shrinking the viewport and any viewport margins. This leads to lowering the bandwidth utilization momentarily to avoid bandwidth waste when the expected future viewport orientation is unclear. If there is a change in direction (below margin speed threshold) or end of head motion, negative margins may be disabled and default margins may be enabled.

Symmetric or directional/uneven negative margins may be used without the implementation of a viewport margin. Negative margins, like viewport margins, may be implemented as multiple margins such that region closest to the viewport gets a higher quality and the quality is gradually decreased as the distance from the viewport increases.

In an embodiment the limit (extent) for negative margin is set dynamically based on one or more of the following non-exhaustive lists: content, metadata, head motion traces, eye gaze, network performance, speed of pose change. In an embodiment the negative margin is applied to a predicted viewport. The prediction may be based on a different indicator (e.g., head motion) and the viewport margin and negative margin may be based on another (e.g., content).

For real-time 360-degree video carried over RTP/RTCP, the extent of negative margin may be signalled from one end to the other using, e.g., RTP header extensions, SDP, RTCP feedback or other means. The value is useful for the receiver to determine viewport feedback frequency. The signalling parameters for viewport margins may be used for indicating negative margin. For example, the minimum viewport margin extent for the top, bottom, left and right viewport margin may be set to a negative value to indicate the use of negative margins.

According to an embodiment, the negative margin extent is proportional to the retrieved media segment duration. For example, the negative margin extent is smaller for a shorter media segment (e.g., DASH segment), whereas the negative margin extent is larger for a longer media segment.

The method according to an embodiment is shown in FIG. 8. The method generally comprises receiving 801 encoded omnidirectional video content for displaying, wherein the encoded omnidirectional video content comprises a viewport region, a margin region outside the viewport region and a background region; defining 802 image regions to be included in the margin region, wherein the definition is based on a margin speed threshold; determining 803 a head speed and a direction of motion; determining 804 when the head speed is greater than or equal to the margin speed threshold, and as a response to the determining, adding negative margins in one or more directions with respect to the viewport; downloading 805 the viewport with a first quality; and downloading the negative margins at a quality lower than the first quality. Each of the steps can be implemented by a respective module of a computer system.

An apparatus according to an embodiment comprises means for receiving encoded omnidirectional video content for displaying, wherein the encoded omnidirectional video content comprises a viewport region, a margin region outside the viewport region and a background region; means for defining image regions to be included in the margin region, wherein the definition is based on a margin speed threshold; means for determining a head speed and a direction of motion; means for determining when the head speed is greater than or equal to the margin speed threshold, and as a response to the determining, means for adding negative margins in one or more directions with respect to the viewport; means for downloading the viewport with a first quality; and downloading the negative margins at a quality lower than the first quality. The means comprises at least one processor, and a memory including a computer program code, wherein the processor may further comprise processor circuitry. The memory and the computer program code are configured to, with the at least one processor, cause the apparatus to perform the method of FIG. 8 according to various embodiments.

Figure 9:
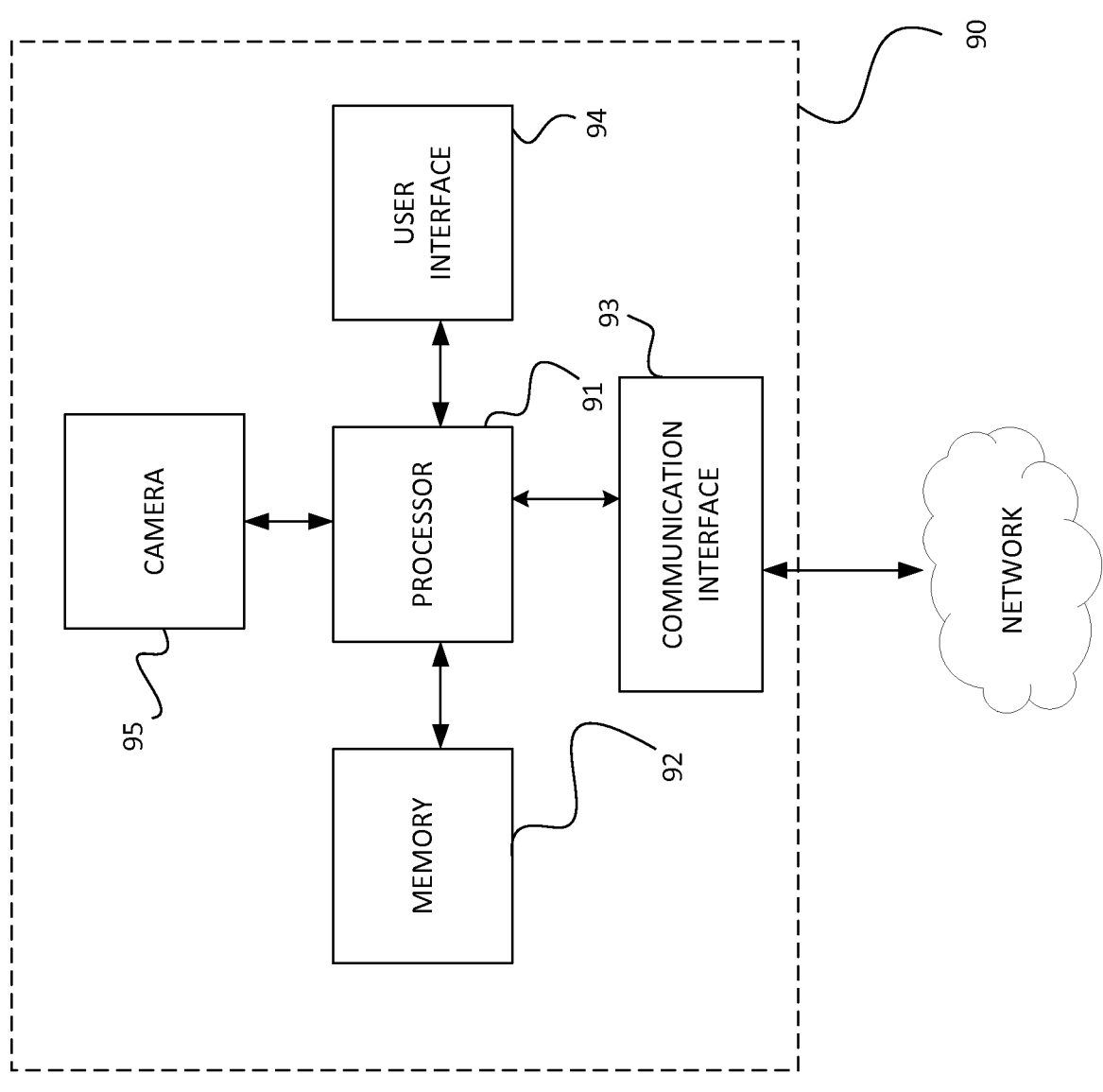
FIG. 9 shows an apparatus according to an embodiment.

An example of an apparatus is shown in FIG. 9. Several functionalities can be carried out with a single physical device, e.g., in a single processor, if desired. The apparatus 90 comprises a main processing unit 91, a memory 92, a user interface 94, a communication interface 93. The apparatus 90, according to an embodiment, shown in FIG. 9, also comprises a camera module 95. The memory 92 stores data including computer program code in the apparatus 90. The computer program code is configured to implement the method according to flowchart of FIG. 8. The camera module 95 receives input data, in the form of video stream, to be processed by the processor 91. The communication interface 93 forwards processed data for example to a display of another device, such an HMD. When the apparatus 90 is a video source comprising the camera module 95, user inputs may be received from the user interface. If the apparatus 90 is a middlebox in a network, the user interface is optional, such as the camera module.

The various embodiments for using negative margins may have advantages. For example, having a negative margin allows the player to extend the high-quality tiles further in the direction of motion without consuming additional bandwidth. As another example, using margins in place of other viewport prediction techniques may ensure that the viewport transition takes place gradually in scenarios where periodic intracoding is not used. Changing the quality of a tile may require intra coding, which requires higher bitrate than inter coding. Thus, gradual viewport transition may help in obtaining a smoother bitrate and consequently a lower end-to-end delay. Other viewport prediction techniques may have no common tile/content between two viewports contiguous in time. Hence, there might be spikes in bitrate because of intra coding. The present embodiments are applicable in 360-degree streaming (e.g., DASH (OMAF)), but also in real-time 360-degree video delivery (e.g., 3GPP ITT4RT).

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of various embodiments.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus comprising at least one processor, memory including computer program code, the memory and the computer program code configured to, with the at least one processor, cause the apparatus to perform at least the following:

receiving encoded omnidirectional video content for displaying, wherein the encoded omnidirectional video content comprises a viewport region corresponding to a viewport, a margin region outside the viewport region and a background region;

defining image regions to be included in the margin region, wherein the definition is based on a margin speed threshold;

determining a head speed and a direction of motion;

determining when the head speed is greater than or equal to the margin speed threshold;

adding negative margins in one or more directions with respect to the viewport;

downloading the viewport with a first quality;

downloading the negative margins at a quality lower than the first quality; and setting a limit for a negative margin dynamically based on one or more of the following: omnidirectional video content, metadata, head motion traces, eye gaze, network performance, or speed of pose change.

2. The apparatus according to claim 1, wherein the apparatus is further caused to add margins in the direction of motion, and adding the negative margins in a direction opposite to the direction of motion.

3. The apparatus according to claim 1, wherein the apparatus is further caused to download the background with a second quality, wherein the second quality is less than the first quality, and other than the quality for downloading the negative margins.

4. The apparatus according to claim 1 wherein the apparatus is further caused to determine a blur speed threshold for a head motion speed above which a user is not able to focus on the omnidirectional video content; and determine when the head speed is greater than the blur speed threshold, whereupon all the image regions are downloaded with a low quality.

5. The apparatus according to claim 1, wherein the apparatus is further caused to determine a margin limit, which is a range of a margin with respect to a size of the viewport, that the margin should not exceed from; and/or determine quality of image regions in the margin.

6. The apparatus according to claim 5, wherein the apparatus is further caused to determine distance of margin image regions from a center of the viewport; for sorting the margin image regions based on the distance and a direction of motion; and when negative margins have been inserted, complement margin in the direction of motion with an equivalent set of margins until a margin limit is met.

7. The apparatus according to claim 1, wherein the limit for the negative margin is proportional to retrieved media segment duration.

8. A method, comprising:

receiving encoded omnidirectional video content for displaying, wherein the encoded omnidirectional video content comprises a viewport region corresponding to a viewport, a margin region outside the viewport region and a background region;

defining image regions to be included in the margin region, wherein the definition is based on a margin speed threshold;

determining a head speed and a direction of motion;

determining when the head speed is greater than or equal to the margin speed threshold, and as a response to the determining, adding negative margins in one or more directions with respect to the viewport;

downloading the viewport with a first quality;

downloading the negative margins at a quality lower than the first quality; and setting a limit for a negative margin dynamically based on one or more of the following: omnidirectional video content, metadata, head motion traces, eye gaze, network performance, or speed of pose change.

9. The method according to claim 8, further comprising adding margins in the direction of motion, and adding the negative margins in a direction opposite to the direction of motion.

10. The method according to claim 8, further comprising downloading the background with a second quality, wherein the second quality is less than the first quality, and other than the quality for downloading the negative margins.

11. The method according to claim 8, further comprising determining a blur speed threshold for a head motion speed above which a user is not able to focus on the omnidirectional video content, and determining when the head speed is greater than the blur speed threshold, whereupon all the image regions are downloaded with a low quality.

12. The method according to claim 8, further comprising determining a margin limit, which is a range of a margin with respect to a size of the viewport, that the margin should not exceed from; and/or determining quality of image regions in the margin.

13. The method according to claim 12, further comprising determining distance of margin image regions from a center of the viewport; sorting the margin image regions based on the distance and a direction of motion; and when negative margins have been inserted, complementing margin in the direction of motion with an equivalent set of margins until a margin limit is met.

14. The method according to claim 8, wherein the limit for the negative margin is proportional to retrieved media segment duration.

15. A non-transitory program storage device readable by a machine, tangibly embodying a program of instructions executable with the machine for performing operations, the operations comprising:

receiving encoded omnidirectional video content for displaying, wherein the encoded omnidirectional video content comprises a viewport region corresponding to a viewport, a margin region outside the viewport region and a background region;

defining image regions to be included in the margin region, wherein the definition is based on a margin speed threshold;

determining a head speed and a direction of motion;

determining when the head speed is greater than or equal to the margin speed threshold, and as a response to the determining, adding negative margins in one or more directions with respect to the viewport;

downloading the viewport with a first quality;

downloading the negative margins at a quality lower than the first quality; and setting a limit for a negative margin dynamically based on one or more of the following: omnidirectional video content, metadata, head motion traces, eye gaze, network performance, or speed of pose change.

\* \* \* \* \*